United States Patent [19]

Marsocci et al.

[11] 4,206,366

[45] Jun. 3, 1980

[54] OPTICAL SMOKE DETECTOR

[75] Inventors: Angelo A. Marsocci, Duxbury; Robert B. Powers, Norwell; Hugh D. Dyer, Norton, all of Mass.

[73] Assignee: American District Telegraph Co., Jersey City, N.J.

[21] Appl. No.: 949,090

[22] Filed: Oct. 6, 1978

[51] Int. Cl.[2] .......... G01N 21/26

[52] U.S. Cl. .......... 250/574; 356/338

[58] Field of Search .......... 356/338, 438; 250/573, 250/574, 575; 340/630

[56] References Cited

U.S. PATENT DOCUMENTS

| | | | |
|---|---|---|---|
| 3,460,124 | 8/1969 | Smith et al. | 340/630 |
| 3,916,209 | 10/1975 | Steele et al. | 250/574 |
| 4,124,298 | 11/1978 | Steele | 356/338 |

*Primary Examiner*—David C. Nelms

*Attorney, Agent, or Firm*—James H. Grover

[57] ABSTRACT

An optical smoke detector including a plurality of walls extending from a dark chamber in which an optical smoke sensor is located. The walls form passages in the detector which extend from smoke entrances on the outer perimeter to smoke ports that feed into the dark chamber. In construction, the smoke entrances extend substantially continuously around the perimeter of the smoke detector to allow the free entry of smoke into the dark chamber. Each wall is arranged to overlap the next so as to obstruct the direct rays of light from entering the dark chamber and a screen is disposed around the perimeter of the detector to prevent the entrance of insects into the dark chamber.

9 Claims, 2 Drawing Figures alarm level of smoke will be detected because of the maximized smoke entry characteristic of the present invention together with the decreased entry of ambient or external light.

It should be understood that the present disclosure is for the purpose of illustration only and that this invention includes all modifications and equivalents which fall within the scope of the appended claims.

As our invention, we claim:

1. An optical smoke detector comprising:

a housing enclosing a dark chamber;

means for sensing smoke in the dark chamber;

said housing including wall means forming a plurality of spiralled passages extending from an outer periphery to smoke ports opening into said dark chamber, the wall means forming smoke entrances extending substantially completely around the entire periphery, the wall means on one side of each passage overlapping the wall means on the other side of the passage so as to obstruct light from entering the smoke port at the end of the passage.

2. The detector according to claim 1 including a wire mesh means disposed around said periphery.

3. The detector according to claim 1 wherein the spiralled passages formed by the wall means converge from the smoke entrances to the smoke ports.

4. The detector according to claim 1 wherein a base is disposed on one side of said wall means and a cover is disposed on the other side, said base and said cover, together with said wall means forming said dark chamber.

5. The detector according to claim 1 wherein said wall means are formed in two portions, one portion of which are walls which extend around said dark chamber and the second portion of which are walls which define said passages.

6. The detector according to claim 5 wherein baffles are disposed in said dark chamber, in front of said smoke ports so as to further obstruct light from entering near the smoke sensing means.

7. The detector according to claim 2 including retaining means in the base to support said wire mesh means.

8. The detector according to claim 7 wherein said retaining means is a channel disposed in the base and extending in front of said smoke entrances.

9. The detector according to claim 1 wherein the smoke sensing means is disposed in the center of said dark chamber.

* * * * *

OPTICAL SMOKE DETECTOR

BACKGROUND OF THE INVENTION

The present invention relates to optical smoke detectors. Such detectors direct a beam of light into a dark chamber which is shielded in as much as possible from ambient light. Air to be tested for the presence of the smoke will flow into the dark chamber and will scatter the light in the beam to initiate an alarm signal.

DESCRIPTION OF THE PRIOR ART

In the past, various arrangements have been utilized to allow smoke to enter a smoke detector. The United States patent to Steele et al U.S. Pat. No. 3,916,209 discloses forming the passages in a swirled shape so that air to be sampled and tested will flow through narrowing passages towards a terminal convergence point and then be diverted into a dark chamber which is disposed below the convergence point. In the United States patent to Steele, Ser. No. 777,043, filed Mar. 14, 1977, U.S. Pat. No. 4,124,298 the optical sensing zone is located in a dark chamber formed by interior walls. Air to be tested enters through smoke entrances that are formed circumferentially and screens are disposed in each smoke entrance to prevent insects from entering the equipment and also reduce the passage of light into the dark chamber.

SUMMARY OF THE INVENTION

According to the present invention, the optical scanning detector includes a centrally located dark chamber and an adjacent smoke sensor. A plurality of walls extending from smoke entrances are disposed on the outer perimeter of the detector to smoke ports that open directly into the dark chamber. The walls cooperate to form passages of diminishing width for air to be sampled to flow from the smoke entrances to the smoke ports. They are arranged so that the entire perimeter of the smoke detector is free from obstructions, save for the width of the walls, thereby allowing air to be tested to enter throughout the entire periphery of the device. A screen is disposed in front of the smoke entrances to prevent insects from entering the passages and flying into the dark chamber. The screen contacts the walls only at their outer ends, if at all, thereby allowing a substantially unobstructed flow of air to be tested. Since the screening constitutes only a negligible obstruction in air flow, relative to the large sizes of the smoke entrances that extend around the entire perimeter of the detector, all air in the immediate area will flow through the passages and into the dark chamber.

DRAWINGS

DESCRIPTION

Figure 1:
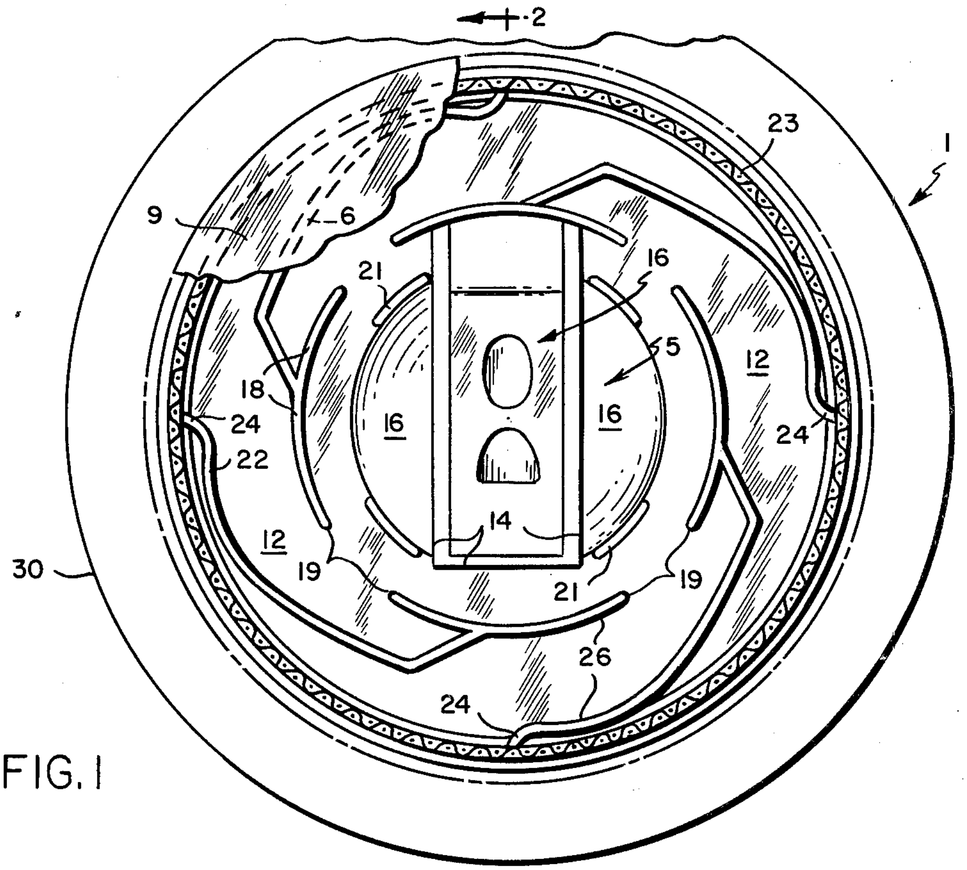
FIG. 1 is a top plan view of the optical smoke detector. A portion of the cover of the detector is shown in the view.
Figure 2:
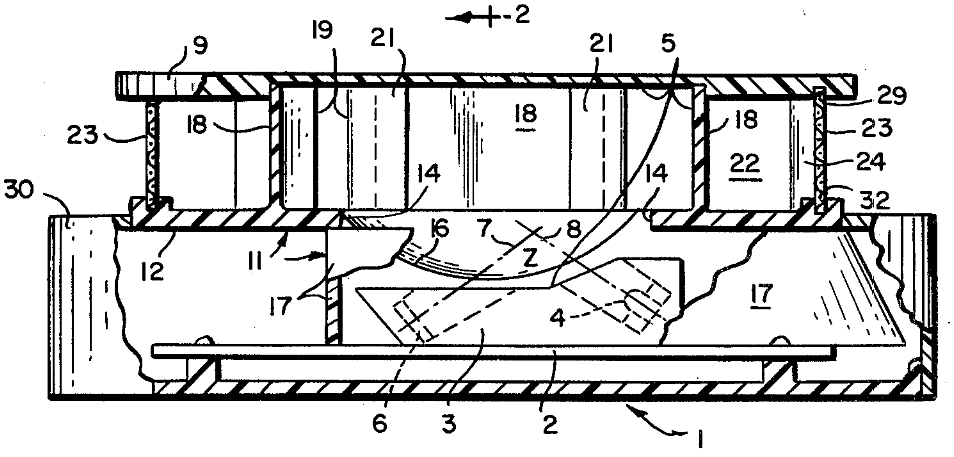
FIG. 2 is a cross sectional view taken along the line 2—2 of FIG. 1.

The optical smoke detector of FIGS. 1 and 2 comprises a disk shaped base 1 on which is secured an electronic circuit board 2, the circuit components being omitted. Attached to the circuit board is an optical block 3 containing a light emitting diode (LED) 4 and a photocell 6. Light from the LED source 4 is directed out a passage in the light block on a first beam axis 7 to intersect a second axis 8 on which the cell 6 views through a passage to a smoke sensing zone Z. Light is scattered by smoke in the sensing zone to the cell 4, exciting the cell to an alarm response if the smoke exceeds a predetermined density.

The intersection zone Z is located in a dark chamber 5 from which light is excluded so far as is possible while admitting smoke as freely as possible. The dark chamber is located between the optical block 3 and a cover 9 in the vertical dimension of FIG. 2 and within a molded plastic wall forming structure 11. The wall forming structure comprises a circular disk 12 interrupted centrally by a rectangular opening 14 modified at two opposite sides by dished out portions 16. Depending from three sides of the rectangular opening are flat walls 17 which fit closely around the optical block and obstruct ambient light entry from the circuit board side of the dark chamber, and which support the wall forming structure on the circuit board 2. A collar 30 covers the detector below the disk 12. It will be understood that reference to the vertical and up and down dimensions are with reference to the smoke detector as shown in the Figures and the detector may be installed on a wall or on a ceiling with vertical and horizontal dimensions reversed. Also while smoke entrances will be described it should be understood that, depending on the direction of smoke currents, entrances will at some times be exits.

Of particular significance in the present invention are the walls and screening extending from the upper side of the disk 12 to the cover 9. A first set of circular walls 18 defining the outer boundary of the dark chamber form smoke ports 19 opening into the dark chamber. Preferably a baffle 21 is located inside each port 19. From the circular walls 18 outwardly spiralled walls 22 extend to an outer periphery of the wall structure defined by a ring shaped screen 23.

The cover 9 over the dark chamber is supported by and attached to the walls 18, 21 and 22 extending upwardly from the disk 12 of the wall forming structure 11. The cover 9 and disk 12 have opposed annular grooves 29 and 32 which receive and positively position the ring shaped screen 23 around the periphery of the detector. The outer ends 24 of the spiralled walls terminate at the periphery and adjacent outer ends 24 of the walls and form smoke entrances 26 at the periphery. Excluding the negligible dimension of the outer ends 24 of the spiralled walls 22, these smoke entrances extend in four quadrants completely, or substantially completely, around the available smoke entry area at the periphery thus maximizing the free entry of smoke toward the dark chamber. At the same time each spiralled wall 22, as extended continuously by the circular walls 18, overlaps its adjacent spiralled wall so that each adjacent wall pair forms an inwarldy spiralling and converging passage 26 from each smoke entrance to a smoke port 19, there being four such passages.

By drawing a line from any spiralled wall outer end 24 through the adjacent passage 26 to the inner smoke port 19, it can be seen that direct light rays from the smoke entrance are blocked by the wall structure. Moreover, the wires of the screen 23 substantially obstruct light rays entering each quadrant of the screened periphery at an oblique angle obstructing approach to each port 19, but at the same time afford the maximum 360° area for radial entry of smoke into the passages 26 leading to the dark chamber. Test data indicate a substantial and significant increase in the speed in which an